W. E. FOWLER, Jr.
BRAKE BEAM.
APPLICATION FILED OCT. 21, 1912.
1,056,408.
Patented Mar. 18, 1913.
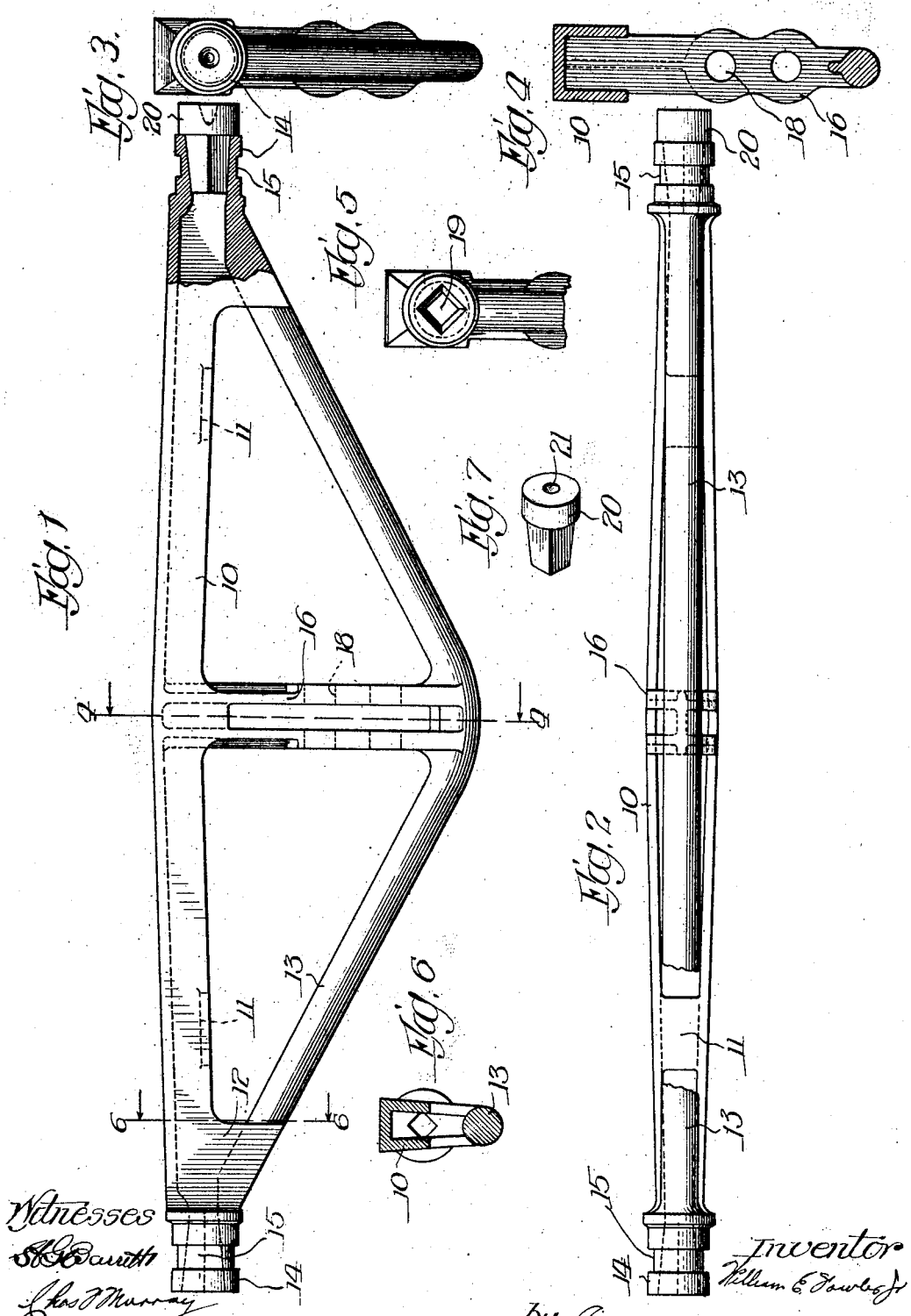

UNITED STATES PATENT OFFICE.

WILLIAM E. FOWLER, JR., OF HAMMOND, INDIANA, ASSIGNOR TO SIMPLEX RAILWAY APPLIANCE COMPANY, OF CHICAGO, ILLINOIS, A CORPORATION OF ILLINOIS.

BRAKE-BEAM.

1,056,408.  Specification of Letters Patent.  Patented Mar. 18, 1913.

Application filed October 21, 1912. Serial No. 726,901.

*To all whom it may concern:*

Be it known that I, WILLIAM E. FOWLER, Jr., a citizen of the United States, and resident of Hammond, in the county of Lake and State of Indiana, have invented certain new and useful Improvements in Brake-Beams, of which the following is a specification.

My invention relates to brake beams and has particular reference to a cast steel beam of novel construction.

An object in the manufacture of brake beams at the present time is to produce a beam which shall have extreme stiffness and absence of deflection at the rated load of such beam. For instance, the railroads require that brake beams for passenger service shall withstand a direct load of 44,000 lbs., with less than $\frac{1}{16}$th of an inch deflection and no appreciable permanent set. The fundamental reason for this is to insure the efficiency of the air brakes to provide the required brake pressure. This object may, of course, be secured in extremely heavy beams but it is desirable to secure the results in as light a beam as possible both in the interest of economy and in dead weight carried by the brake hanger. The maximum rigidity and stiffness is possible only in a cast beam for the reason that there are no interfitting parts such as the tension member lapping around or otherwise secured to the compression member the strut having a more or less insecure bearing on the tension and compression members and the trunnion or brake-head-carrying member being more or less insecurely applied to the ends of the truss.

In the brake beam shown herein I have combined the advantages of a truss beam with its light weight and the rigidity of a cast beam. The form of the different parts follows closely the built-up trussed beam inasmuch as that form has been found in service to be extremely efficient. For instance, the compression member is of channel-shape, wider at the middle than toward the ends, the tension member is a round rod and the ends where the members are joined are made hollow in the interest of lessened weight.

Another advantage secured by the hollow end construction is in that the trunnions to which the brake heads are applied may be turned in a lathe without loss of time required in centering the trunnion. This is accomplished by providing a squared or other non-circular opening within which a false center or centering plug may be temporarily placed.

The invention will be more readily understood by reference to the accompanying drawings wherein, Figure 1 is a side elevation of a brake beam constructed in accordance with my invention, a portion of one end being broken away to show the hollow interior; Fig. 2 is a bottom plan view; Fig. 3 is an end elevation; Fig. 4 is a transverse section on the line 4—4 of Fig. 1; Fig. 5 is a partial end elevation showing the centering plug removed; Fig. 6 is a section on the line 6—6 of Fig. 1, and Fig. 7 is a perspective view of the centering plug.

Referring more particularly to the drawings it will be seen that my novel beam is composed of a channel compression member 10, having webs 11 uniting the flanges of the channel at points intermediate the ends. This adds needed strength at the points where such ties are applied. In tests to destruction it will be found that deflection occurs at or about the point 11, the indication of such deflection being in the displacement of the depending flanges. The channel compression member terminates at each end in the downwardly projecting flanges 12, which unite with the round tension member 13 at its ends, the construction being in the form of a box having open ends. The trunnions 14 are integral with the box ends and are provided with a locking groove 15 therein. By reference to Figs. 2 and 3 it will be seen that the channel compression member is tapered from the center toward each end, in order to provide the required strength. The strut 16 is integrally secured to the compression and tension members and may be of any preferred form, that shown providing the required strength and rigidity. The strut is in the form of two standards the opening therebetween accommodating the brake lever. These standards at their upper ends are in the form of T's, whereas the lower portions are enlarged slightly at points opposite the brake lever bolt openings 18.

The end trunnions, as shown, are hollow, the opening 19 therethrough being squared or non-circular in outline. This accomplishes the double purpose of lessening weight and providing a seat for a false center or centering plug 20, having a lathe spindle recess 21 therein. After the casting has been removed from the sand and properly cleaned, the centering plugs are placed in the opening and the beam placed in the lathe. The trunnions may thus be easily turned without the delay of locating the center, which is necessary in a beam having solid end trunnions.

The device as shown has been found to be practical in service and has minimum weight for maximum strength and rigidity. Modifications may be made in the exact construction, all without departing from the spirit of my invention.

I claim:

1. A brake beam composed of a channel compression member, a tension member and hollow end trunnions, the parts being formed in a single casting, substantially as described.

2. A brake beam composed of a channel compression member, a round rod tension member and hollow end trunnions, the parts being formed in a single casting, substantially as described.

3. A brake beam composed of a channel compression member, round tension member and end trunnions, all formed in a single casting, the width of the channel member tapering from the center toward each end, substantially as described.

4. A brake beam composed of a channel compression member, a round rod tension member and end trunnions all formed in a single casting, the structure being box-shaped at the junction of the tension and compression members, substantially as described.

5. A brake beam composed of a channel compression member, a tension member, a strut and end trunnions, all formed in a single casting, said trunnions having a non-circular axial recess whereby to eliminate weight and provide for a centering plug, substantially as described.

6. A brake beam composed of a channel compression member, a tension member and a middle strut, said channel tapering in width from the middle to the ends, the flanges of the channel being tied together by a web at points intermediate the ends, substantially as described.

WILLIAM E. FOWLER, Jr.

Witnesses:
 CHAS. V. MURRAY,
 T. D. BUTLER.